United States Patent
Groitzsch et al.

(10) Patent No.: US 8,645,025 B2
(45) Date of Patent: Feb. 4, 2014

(54) SYSTEM AND METHOD FOR STABILIZING A MOTOR VEHICLE

(75) Inventors: Stephan Groitzsch, Weinheim (DE); Hans Christian Enders, Bad Soden (DE); Otmar Schreiner, Griesheim (DE); Frank Steinmeier, Eppstein (DE); Daniel Fischer, Schwalbach (DE); Stefan Stölzl, Weinheim (DE)

(73) Assignee: Continental Teves AG & Co. oHG (DE)

( * ) Notice: Subject to any disclaimer, the term of this patent is extended or adjusted under 35 U.S.C. 154(b) by 227 days.

(21) Appl. No.: 12/673,539

(22) PCT Filed: Aug. 15, 2008

(86) PCT No.: PCT/EP2008/060771
§ 371 (c)(1),
(2), (4) Date: Dec. 12, 2011

(87) PCT Pub. No.: WO2009/022014
PCT Pub. Date: Feb. 19, 2009

(65) Prior Publication Data
US 2012/0072073 A1    Mar. 22, 2012

(30) Foreign Application Priority Data
Aug. 16, 2007 (DE) .......................... 10 2007 038 850
Aug. 12, 2008 (DE) .......................... 10 2008 038 642

(51) Int. Cl.
*G05D 1/08*   (2006.01)
(52) U.S. Cl.
USPC ........................................... 701/41; 701/29.1

(58) Field of Classification Search
USPC ........ 701/82, 41, 70, 1, 124, 45, 71, 79, 29.1;
180/197; 303/139, 163, 146, 113.1,
303/113.2; 73/65.07, 65.01
See application file for complete search history.

(56) References Cited

U.S. PATENT DOCUMENTS

| | | | |
|---|---|---|---|
| 4,255,883 A * | 3/1981 | Ealy | 37/348 |
| 5,341,297 A | 8/1994 | Zomotor et al. | |
| 5,489,979 A * | 2/1996 | Corghi | 356/139.09 |

(Continued)

FOREIGN PATENT DOCUMENTS

| | | |
|---|---|---|
| DE | 3825639 A1 | 2/1990 |
| DE | 4123235 C1 | 11/1992 |

(Continued)

OTHER PUBLICATIONS

M.H. Koelink et al., "Laser Doppler velocimeter based on the self-mixing effect in a fiber-coupled semiconductor laser: theory", Applied Optics, vol. 31, 1992, pp. 3401-3408.

*Primary Examiner* — Marthe Marc-Coleman
(74) *Attorney, Agent, or Firm* — RatnerPrestia (57) ABSTRACT

A system and method for stabilizing a motor vehicle. The system includes a speed sensor for sensing a longitudinal speed and a transversal speed of the motor vehicle. The system also includes a calculation unit designed to calculate an attitude angle of the motor vehicle from the longitudinal speed and the transversal speed. The system also includes an evaluation unit designed to compare the attitude angle with a threshold value and to detect an oversteering situation if the attitude angle exceeds the threshold value. The system also includes an actuation unit which influences the driving behavior of the motor vehicle. The actuation unit is designed to actuate an actuator in an oversteering situation.

9 Claims, 4 Drawing Sheets

(56) References Cited

U.S. PATENT DOCUMENTS

| | | | |
|---|---|---|---|
| 5,641,212 A * | 6/1997 | Sakai | 303/147 |
| 5,671,143 A | 9/1997 | Graeber | |
| 5,717,591 A | 2/1998 | Okada et al. | |
| 5,893,896 A * | 4/1999 | Imamura et al. | 701/70 |
| 6,100,965 A | 8/2000 | Nerin | |
| 6,526,334 B1 | 2/2003 | Latarnik et al. | |
| 6,974,195 B2 * | 12/2005 | Batistic et al. | 303/146 |
| 7,246,864 B2 * | 7/2007 | Kato et al. | 303/146 |
| 7,522,991 B2 | 4/2009 | Lich et al. | |
| 7,641,014 B2 * | 1/2010 | Hu | 180/197 |
| 2004/0195030 A1 | 10/2004 | Eberle et al. | |
| 2006/0150717 A1 * | 7/2006 | Lich et al. | 73/65.07 |
| 2007/0170667 A1 | 7/2007 | Xu et al. | |
| 2007/0288140 A1 | 12/2007 | Wheals et al. | |
| 2008/0201038 A1 | 8/2008 | Jung et al. | |

FOREIGN PATENT DOCUMENTS

| | | | |
|---|---|---|---|
| DE | 19533575 A1 | 3/1996 | |
| DE | 19515051 A1 | 5/1996 | |
| DE | 19623596 * | 6/1996 | B60T 8/1755 |
| DE | 19623595 A1 | 12/1997 | |
| DE | 19623596 A1 | 12/1997 | |
| DE | 10061075 A1 | 7/2002 | |
| DE | 10121386 C1 | 8/2002 | |
| DE | 10247994 A1 | 4/2004 | |
| DE | 10296926 T5 | 4/2004 | |
| DE | 10350920 A1 | 5/2005 | |
| DE | 102005049396 A1 | 4/2006 | |
| DE | 102004060677 A1 | 6/2006 | |
| DE | 102005024875 B2 | 10/2006 | |
| DE | 102006036921 A1 | 4/2007 | |
| EP | 0716948 A2 | 6/1996 | |
| FR | 2761782 | 10/1998 | |

\* cited by examiner

SYSTEM AND METHOD FOR STABILIZING A MOTOR VEHICLE

CROSS REFERENCE TO RELATED APPLICATIONS

This application is the U.S. national phase application of PCT International Application No. PCT/EP2008/060771, filed Aug. 15, 2008, which claims priority to German Patent Application No. 10 2007 038 850.2, filed Aug. 16, 2007 and German Patent Application No. 10 2008 038 642.1, filed Aug. 12, 2008, the contents of such applications being incorporated by reference herein.

FIELD OF THE INVENTION

The invention relates to a system for stabilizing a motor vehicle. In addition, the invention relates to a method for stabilizing a motor vehicle which the system is suitable for carrying out.

BACKGROUND OF THE INVENTION

Vehicle movement dynamics control systems such as the known ESP system, which is described for example in DE 195 15 051 A1, which is incorporated by reference, serve to stabilize a motor vehicle in critical travel situations.

Such systems are usually based on yaw rate control. In this context, the current yaw rate of the vehicle is sensed by means of a yaw rate sensor and compared with a setpoint yaw rate. The setpoint yaw rate is acquired by means of a vehicle model using the vehicle speed and the wheel lock angle set by the driver at the steerable wheels of the vehicle. The vehicle speed and the wheel lock angle are sensed with appropriate sensors. If the difference between the setpoint yaw rate and the measured yaw rate exceeds a threshold value in terms of absolute value, an unstable driving state is detected and the vehicle is stabilized by interventions into the driving behavior.

The stabilizing interventions into the driving behavior comprise braking interventions at individual wheels of the vehicle. In vehicles with hydraulic brake systems, a hydraulic unit which is integrated into the brake system and which permits brake pressure to be built up on a wheel-specific basis is used to carry out the braking interventions. Depending on whether an oversteering or understeering vehicle behavior has been detected, the braking intervention takes place at a front wheel or a rear wheel if the vehicle is a four-wheeled vehicle with two axles.

The described vehicle movement dynamics control system is relatively costly owing to the required sensor system. In addition, the expenditure on the adaptation of controller parameters such as, for example, of the yaw rate threshold value and the determination of the vehicle model of individual vehicles or vehicle types entails relatively high costs.

SUMMARY OF THE INVENTION

An object of the present invention is to make available a simpler vehicle movement dynamics control system with which a vehicle can be stabilized in critical driving situations, in particular in oversteering situations.

According to a first aspect of the invention, a system for stabilizing a motor vehicle is proposed. The system comprises at least one speed sensor for sensing a longitudinal speed and a transversal speed of the motor vehicle;

a calculation unit which is designed to calculate an attitude angle of the motor vehicle from the sensed longitudinal speed and the sensed transversal speed;

an evaluation unit which is coupled to the calculation unit and is designed to compare the attitude angle with a predefined threshold value and to detect an oversteering situation if the attitude angle exceeds the threshold value;

an actuation unit which is coupled to the evaluation unit, and an actuator which influences the driving behavior of the motor vehicle, wherein the actuation unit is designed to actuate the actuator in an oversteering situation.

According to a second aspect of the invention, a method is proposed which comprises the following steps:

sensing of a longitudinal speed and of a transversal speed of the motor vehicle by means of at least one speed sensor;

calculation of an attitude angle of the motor vehicle from the sensed longitudinal speed and the sensed transversal speed;

observation of the attitude angle and detection of an oversteering situation if the attitude angle exceeds a threshold value; and, if an oversteering situation has been detected, actuation of an actuator in order to influence the driving behavior of the motor vehicle.

One advantage of the invention is that the attitude angle of the motor vehicle is used as a control variable instead of the yaw rate. There is therefore no longer any need for a yaw rate sensor. Instead, the transversal speed of the vehicle is sensed, for which purpose a sensor which is of simple design and inexpensive can be used. In addition, it has been found that the attitude angle threshold value can be adapted at lower cost than the adaptation of the parameters of a yaw rate control system together with a vehicle model.

Furthermore, with the proposed vehicle movement dynamics control system it is not necessary to sense the wheel lock angle, as a result of which the corresponding sensor can be dispensed with. This provides further simplification and reduces the susceptibility to faults owing to the smaller number of components. In addition, the system is more cost-effective.

In one embodiment of the system and of the method, an optical speed sensor is provided for sensing the vehicle transversal speed and/or the vehicle longitudinal speed and is designed to sense and evaluate light which is reflected at a roadway surface on which the motor vehicle is moving during operation, in order to determine the vehicle transversal speed and/or the vehicle longitudinal speed.

The advantage of an optical sensor is, in particular, that no mechanical components which have to be mounted and adjusted in a specific way are required in order to permit a precise measurement. The manufacture of the sensor is therefore basically simpler and more cost-effective than in the case of a mechanical sensor.

The optical speed sensor can, for example, sense images of the roadway surface and acquire the longitudinal speed and/or transversal speed of the vehicle from a displacement of structures within successively recorded images.

The sensor can equally well be a sensor with a light source which emits a coherent measuring light beam, in particular a laser beam, in the direction of the roadway surface, which light beam is reflected by the roadway surface and interferes with the light in the light source. The interference can be detected by means of an interference detector, and the transversal speed or the longitudinal speed of the vehicle can be acquired on the basis of a measurement variable sensed by means of the interference detector, given suitable orientation of the measuring light beam. Using two measuring light beams permits the vehicle transversal speed and the vehicle longitudinal speed to be sensed.

The location of the interference can be in particular the light source whose operating state is changed on the basis of the interference, which is also referred to as a self-mixing effect. The changes in the operating state can be sensed with the interference detector.

In a further refinement of the system and of the method, the speed sensor comprises a position-determining system, and the vehicle transversal speed and/or the vehicle longitudinal speed are/is determined by tracking a position of the motor vehicle by means of the position-determining system.

Such a speed sensor also has the advantage that there is no need for a particular support or adjustment of mechanical components in order to be able to carry out precise measurements.

A development of the system and of the method comprises the actuator being designed to apply a braking force to a front wheel of the vehicle on the basis of the actuation by the actuation unit in an oversteering situation. As a result, the vehicle can be effectively stabilized in an unstable driving situation.

One embodiment of the system and of the method is defined by the fact that the vehicle transversal speed and the vehicle longitudinal speed are the only vehicle movement dynamics variables which can be sensed.

In particular, in this embodiment the yaw rate of the vehicle or the wheel lock of the steerable wheels is not sensed. The sensing of further vehicle movement dynamics variables, such as for example the transversal acceleration, is also dispensed with. As a result, only a small number of sensors is required, so that the proposed vehicle movement dynamics control system is particularly simple and cost-effective.

A vehicle movement dynamics variable is understood here to be a variable which characterizes the driving state of the vehicle, in particular a driving state variable. Pure operating data of the motor vehicle, such as for example a brake pressure which is set in a hydraulic brake system of the motor vehicle, are not considered to be vehicle movement dynamics variables in this sense.

In order to expand the field of use of the vehicle movement dynamics control system, in one embodiment of the system and of the method a steering angle sensor is provided for sensing a wheel lock angle which is set at steerable wheels of the vehicle, and an evaluation unit is provided which is designed to detect an understeering situation on the basis of the wheel lock angle and a simple vehicle model. In this embodiment, instabilities owing to understeering can also be detected as well as the instabilities which arise owing to oversteering.

A connected embodiment of the system and of the method is defined by the fact that the evaluation unit is designed to detect an understeering situation if the wheel lock angle is larger than the theoretically possible wheel lock angle (f(v)).

In order to be able to stabilize the vehicle in understeering situations, one development of the system and of the method comprises the actuation unit being designed to act on a drive engine of the motor vehicle in an understeering situation in such a way that a speed and/or acceleration of the motor vehicle are/is reduced.

The vehicle may be, for example, a four-wheeled motor vehicle. In oversteering situations, such a vehicle is expediently stabilized by virtue of the fact that a front wheel, preferably the front wheel on the outside of a bend, is braked. In an understeering situation, such a vehicle can be stabilized by braking a rear wheel, in particular the rear wheel on the inside of a bend. One embodiment of the system and of the method therefore provides that the actuator is designed to apply a braking force to a rear wheel of the motor vehicle on the basis of actuation by the actuation unit in an understeering situation.

As previously mentioned, in an understeering situation the vehicle can also be stabilized by reducing the drive torque which is made available by the drive engine. Braking interventions are therefore not absolutely necessary at the rear wheels even if the vehicle movement dynamics control extends to understeering situations. If the vehicle movement dynamics control remains limited to oversteering situations, braking interventions at the rear wheels are not necessary either.

One development of the system and of the method therefore comprises the actuator being configured in such a way that it can apply a braking force exclusively to the front wheels of the motor vehicle.

As a result, the actuator can advantageously be configured more simply and cost-effectively than an actuator with which a braking force can also be built at the rear wheels.

The abovementioned advantages, particularities and expedient developments of the invention as well as further advantages, particularities and expedient developments of the invention will also become clear on the basis of the exemplary embodiments which are described below with reference to the Figures.

DETAILED DESCRIPTION OF THE PREFERRED EMBODIMENTS

Figure 1:
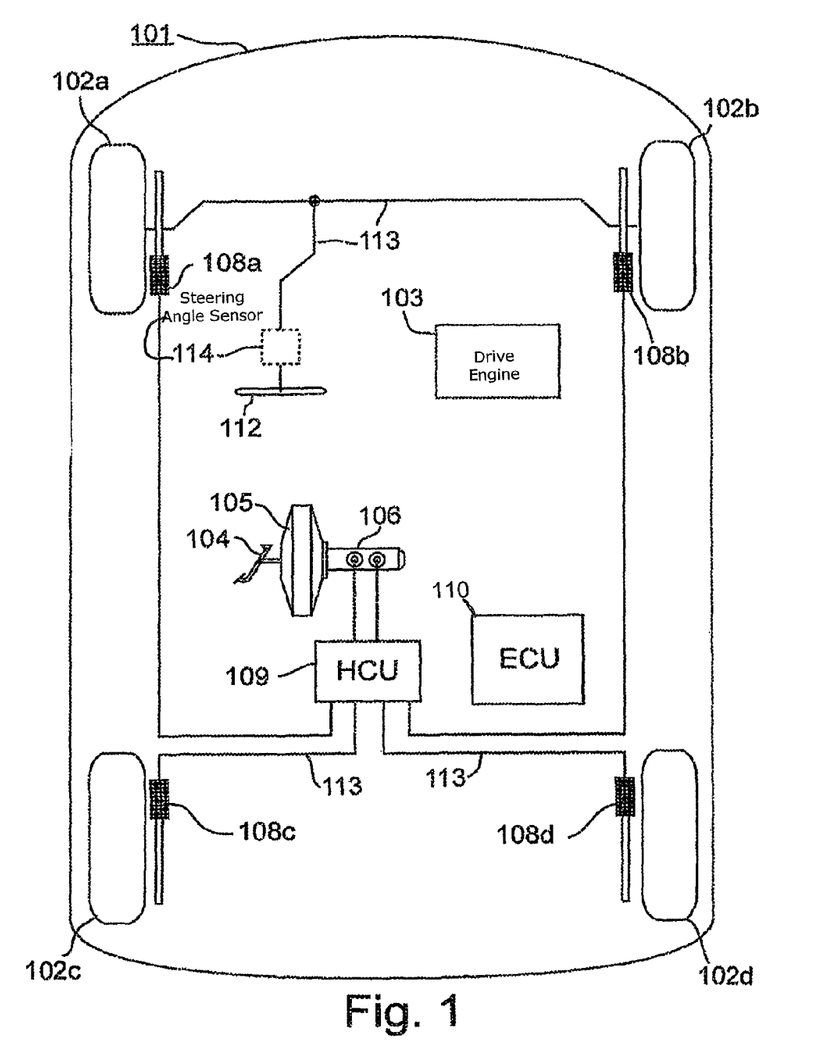
FIG. 1 is a schematic illustration of a motor vehicle which comprises a system for carrying out vehicle movement dynamics control.

FIG. 1 is a schematic illustration of a four-wheeled motor vehicle 101 with two front wheels 102a, 102b and two rear wheels 102c, 102d.

The front wheels 102a, 102 are steerable and the wheel lock angle can be set by the driver by means of a steering handle 112 which is connected to the front wheels 102a, 102b via a steering train 113.

The vehicle 101 is driven by a drive engine 103, which may be, for example, an internal combustion engine, an electric motor or a hybrid motor. The drive engine 103 generates an engine torque which is transmitted via a drive train (not illustrated in FIG. 1) to two or four vehicle wheels 102a, 102b, 102c, 102d, in order to drive these wheels 102a, 102b, 102c, 102d.

In order to brake the vehicle 101, a brake system is provided which is configured as a hydraulic brake system in the illustration. The brake system comprises an activation device 113 which is connected to a master brake cylinder 106 via a brake booster 105 and is preferably embodied as a brake pedal. The master brake cylinder 106 is connected in terms of flow to a reservoir vessel 107 for hydraulic fluid and is preferably embodied as what is referred to as a tandem master cylinder in which in each case one of two coupled pressure chambers is provided for supplying pressure to a brake circuit which comprises two of the four wheel brakes 108a, 108b, 108c, 108d. The wheel brakes 108a, 108b, 108c, 108d are each assigned to a wheel 102a, 102b, 102c, 102d. The brake circuits have, for example, an X distribution in which a pressure chamber of the master cylinder 106 supplies the front right-hand wheel brake 108b and the rear left-hand wheel brake 108c, and the other pressure chamber supplies the front left-hand wheel brake 108a and the rear right-hand wheel brake 108b.

The activation device 104 can be used to build up a brake pressure, via the brake booster 105, in a hydraulic fluid which is located in the master brake cylinder 106, which brake pressure can be transmitted via pressure lines to the wheel brakes 102a, 102b, 102c, 102d. Owing to the application of pressure and a wheel brake 108a, 108b, 108c, 108d, a braking torque is applied to the associated wheel 102a, 102b, 102c, 102d, and the latter is therefore braked.

The master brake cylinder 106 is connected to the wheel brakes 108a, 108b, 108c, 108d via a hydraulic unit 109. The hydraulic unit 109 serves as an actuator for influencing the driving behavior of the vehicle 101 and is actuated by means of a control unit (ECU) 110. Vehicle movement dynamics control, and preferably also brake slip control (ABS—antilock brake system), are carried out by means of the control unit 110. The vehicle movement dynamics control which is provided will be explained below in more detail. The brake slip control is carried out in a manner which is known per se to a person skilled in the art and will therefore not be described in more detail.

The control unit 110 is preferably a control device with a microprocessor for executing programs whose program code can be stored in the control unit 110. The vehicle movement dynamics control system and the brake slip control system comprise, in this embodiment of the control device, software which is executed on the microprocessor of the control device. The algorithms which are provided are processed in a looped fashion here, with one loop being run through once in each clocking step in order to generate an output signal, if appropriate.

In one embodiment, the hydraulic unit 109 is divided into two subassemblies which are constructed in the same way and are each assigned to two wheel brakes 108a, 108b, 108c, 108d. The wheel brakes 108a, 108b, 108c, 108d, which are assigned to a subassembly, can be the wheel brakes 108a, 108b, 108c, 108d of a brake circuit, for example.

Figure 2:
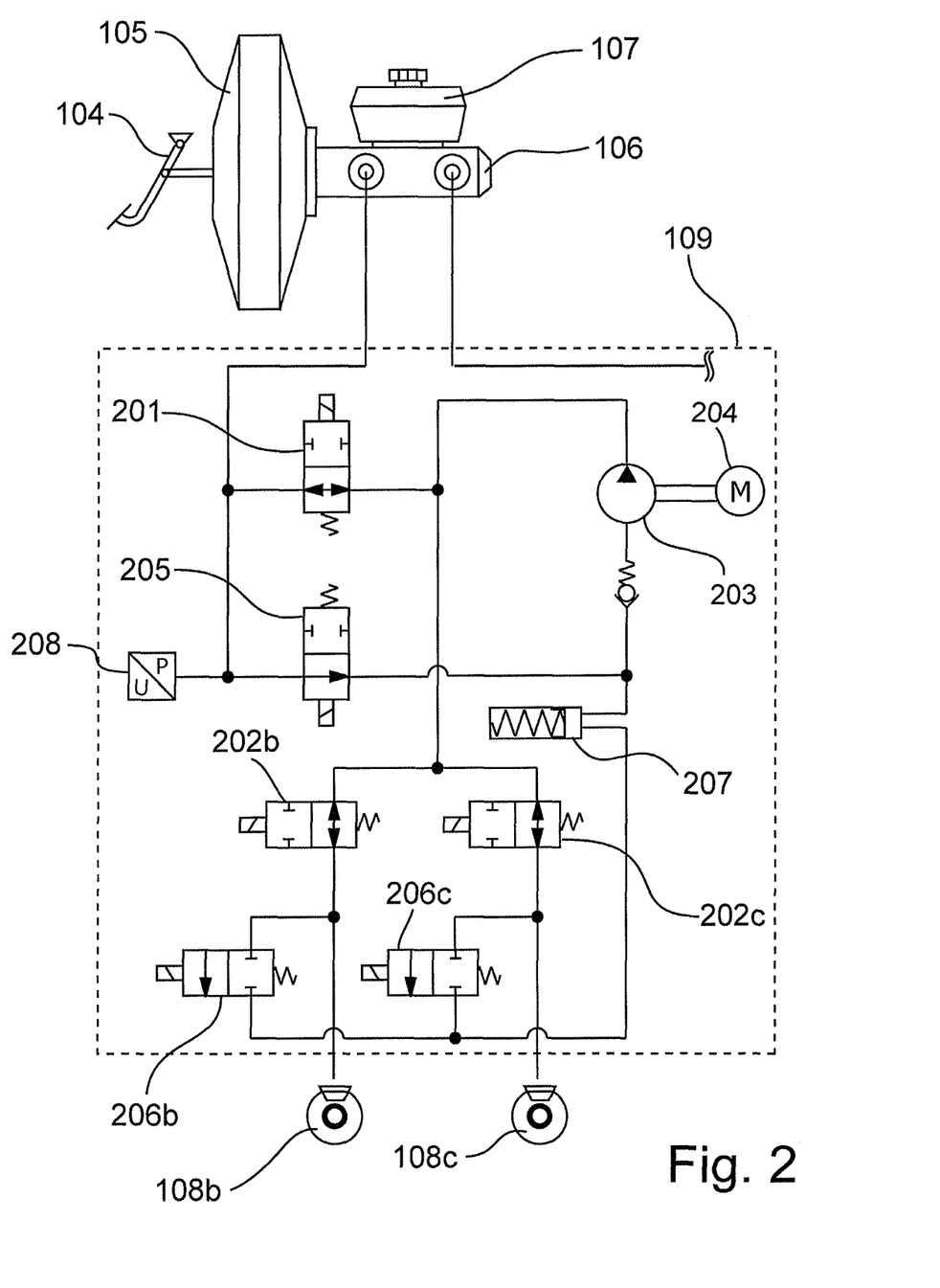
FIG. 2 is a schematic illustration of a subassembly of a hydraulic unit of the motor vehicle.

In FIG. 2, the hydraulic unit is illustrated in a schematic circuit diagram with one of the subassemblies which is assigned, by way of example, to the front right-hand wheel brake 108b and to the rear left-hand wheel brake 108c. The wheel brakes 108b, 108c are connected inside the subassembly to the master brake cylinder 106 via an isolating valve 201 which is open in the currentless state. In addition, in each case an inlet valve 202b, 202c, which is also opened in the currentless state, is assigned to the wheel brakes 108b, 108c. During a braking process which is controlled exclusively by the driver, a brake pressure which is built up in the master brake cylinder 106, which is also referred to as an admission pressure, is transmitted directly to the wheel brakes 108b, 108c.

The hydraulic unit 109 also comprises a hydraulic pump 203 which is driven by an engine 204, which can also be provided for driving the hydraulic pump of the subassembly (not illustrated) of the hydraulic unit 109. By means of the hydraulic pump 203, a brake pressure can be applied to the wheel brakes 108b, 108c independently of the driver. In order to build up pressure, the isolating valve 201 is closed and the switchover valve 205 which is closed in the currentless state is opened, with the result that a connection is produced between the master brake cylinder 106 and the intake side of the hydraulic pump 203, and the master brake cylinder 106 is decoupled from the pressure side of the hydraulic pump 203. The hydraulic pump 203 is therefore able to feed hydraulic fluid from the master brake cylinder 106 or the reservoir vessel 107 into the wheel brakes 108a, 108b and therefore increase the brake pressure in the wheel brakes 108a, 108b. This serves in the vehicle movement dynamics control system provided to apply a braking force to one wheel 102a, 102b, 102c, 102d in each case, in order to stabilize the vehicle.

In order to be able to reduce the brake pressure in the wheel brakes 108b, 108c counter to an existing admission pressure, an outlet valve 206b, 206c which is closed in the currentless state is assigned to each wheel brake 108b, 108c. If the outlet valve 206b, 206c is opened, hydraulic fluid can escape from the corresponding wheel brake 108a, 108b into a low pressure accumulator 207. The hydraulic fluid can be fed back from the low pressure accumulator 207 into the master brake cylinder 106 by means of the hydraulic pump 203, for which purpose the switchover valve 205 and the inlet valves 202b, 202c are closed and the isolating valve 201 is opened. The brake pressure in a wheel brake 108a, 108b, 108c, 108d is reduced, in particular within the scope of the brake slip control which is, if appropriate, provided, if the associated wheel 102a, 102b, 102c, 102d locks or risks locking during a braking process.

Furthermore, a brake pressure which is present in the wheel brakes 108b, 108c can be kept constant by closing the inlet valve 202b, 202c assigned to the wheel brake 108b, 108c, and the associated outlet valve 206b, 206c. The maintenance of the brake pressure in a wheel brake 108a, 108b, 108c, 108d is used in the vehicle movement dynamics control system provided and in the brake slip control system which is, if appropriate, provided, to maintain a brake pressure over a specific time—i.e. over one or more clocking steps of the control unit 110.

The admission pressure which is set by the driver is sensed by means of a pressure sensor 208, which is preferably contained in just one of the two subassemblies of the hydraulic unit 109.

In the previously illustrated embodiment, the hydraulic unit 109 is enabled to increase and to reduce the brake pressure in all the wheel brakes 108a, 108b, 108c, 108d by means of the hydraulic pump 203 compared to the driver's specification. Such a hydraulic unit 109 is known per se to a person skilled in the art from conventional vehicle movement dynamics control systems.

In a further embodiment, the hydraulic unit 109 is simplified in such a way that the brake pressure in all the wheel brakes 108a, 108b, 108c, 108d can be reduced compared to the driver's specification, to be precise in such a way that an increase in the brake pressure compared to the driver's specification is possible, but only in the wheel brakes 108a, 108b of the front wheels 102a, 102b.

For this purpose, the hydraulic unit 109 comprises a subassembly which is assigned to the front wheel brakes 108a, 108b and is configured in the previously described way. This subassembly serves to apply braking force to the front wheels 102a, 102b within the scope of the vehicle movement dynamics control system which is provided. In addition, the subassembly is used in the brake slip control system, which is, if appropriate, provided, to reduce the braking force at the front wheels 102a, 102b.

In the wheel brakes 108c, 108d of the rear wheels 102c, 102d, the brake pressure can only be reduced compared to the driver's specification by means of a further subassembly of the hydraulic unit 109, in order to permit brake slip control. This subassembly differs from the previously described subassembly in that there is no isolating valve 201 or switchover valve 205 provided. In particular, the isolating valve 201 is removed from the pressure line, and the branch in the hydraulics which contains the switchover valve is omitted. As a result, the hydraulic unit 109 can be simplified compared to the conventional hydraulic unit of a vehicle movement dynamics control system.

If a brake slip control system is not provided, it is also possible to dispense with the second subunit of the hydraulic unit 109, and a direct connection can be provided between the master brake cylinder 106 and the wheel brakes 108c, 108d of the rear wheels 102c, 102d.

In one embodiment, input variables for the vehicle movement dynamics control system which is provided are only the longitudinal speed and the transversal speed of the vehicle. In particular, these are understood to be the longitudinal speed and transversal speed of the centre of gravity of the vehicle.

The transversal speed is sensed using a speed sensor 111. The speed sensor 111 can also be used to sense the vehicle longitudinal speed. Alternatively, the vehicle longitudinal speed can be acquired, in a way known per se to a person skilled in the art, from the signals of wheel speed sensors which are arranged on the wheels 102a, 102b, 102c, 102d of the vehicle 101.

The speed sensor 111 can basically be configured in any desired fashion.

One exemplary embodiment involves the optical speed sensor for sensing the longitudinal speed and/or transversal speed of the vehicle 101, which is described in DE 10 2004 060 677 A1. The sensor comprises a camera which is mounted on the underfloor of the vehicle 101 and takes images of the roadway surface on which the vehicle 101 is moving. The sensor detects displacements in structures within successively taken images of the roadway surface and determines the longitudinal speed and/or transversal speed of the vehicle 101 from the displacements. The sensor can therefore be used to sense only the transversal speed or additionally also the longitudinal speed.

Figure 3:
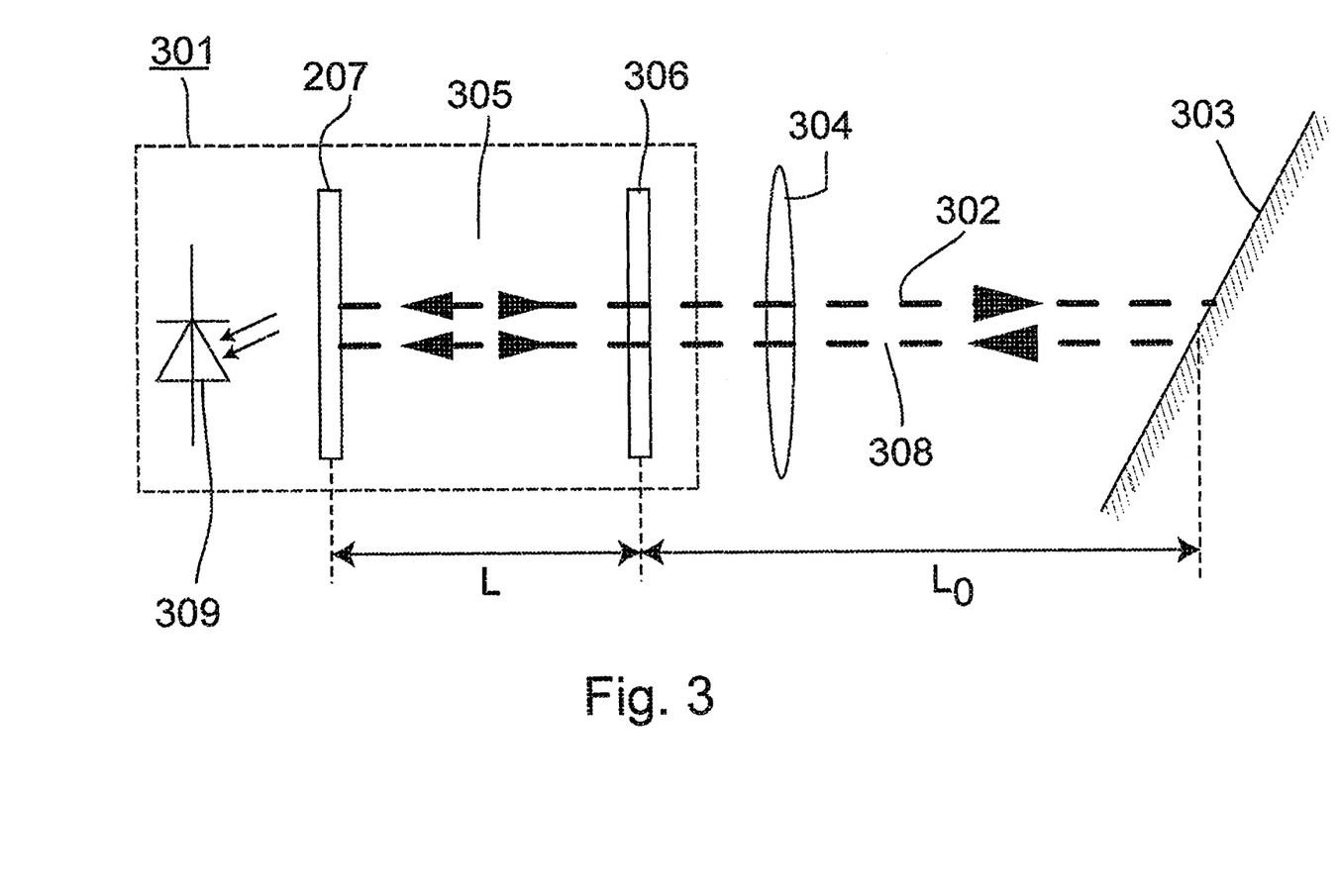
FIG. 3 is a schematic illustration of a laser unit for sensing the vehicle longitudinal speed and/or vehicle transversal speed.

In a further embodiment, the speed sensor 111 comprises one or two laser units, one laser unit 301 of which is illustrated in FIG. 3. Each laser unit 301 is mounted on the underfloor of the vehicle 101 and emits a measuring light beam 302 at an angle with respect to the underfloor of the vehicle 101 in the direction of the roadway surface 303. An optical element 304—preferably an arrangement of optical lenses—concentrates the measuring light beam 302 and focuses it on a point of the roadway 303 or on a point in the vicinity of the roadway surface 303. The measuring light beam 302 of a laser unit 301 is formed by coherent light and is generated, for example, in a semiconductor laser which can be configured in one embodiment as a vertical cavity surface emitting laser (VCSEL). The light is preferably in an invisible spectral range, in particular in the infrared spectral range, with the result that the measuring light beam 302 cannot be seen and road users are not distracted. However, alternatively it is also possible to use light in another spectral range.

Each laser unit 301 comprises a resonator 305 of the length L, which is limited by a front semitranslucent mirror 306 and a rear semitranslucent mirror 307. The measuring light beam 302 is formed by light which emerges from the resonator 305 in the direction of the roadway surface 303 through the front mirror 306. The length of the distance which the measuring light beam 302 travels between the resonator 305 or the front mirror 306 and the roadway surface 303 is denoted hereby $L_0$. The measuring light beam 302 is scattered at the roadway surface 303. Part of the scattered light is reflected in opposite directions to the measuring light beam 302 as a scattered light beam 308. As a result of the optical device 304, the scattered light beam 308 passes into the resonator 305 and interferes there with the light which is amplified in the resonator 305.

If the resonator 305 and the roadway surface 303 move relative to one another with a speed component $v_L$ in the direction of the measuring light beam 103 owing to a movement of the vehicle 101, the scattered light beam 308 experiences a Doppler shift. This is a change in the frequency of the light or of the wavelength as a function of the abovementioned speed component $v_L$. Owing to the feeding back of the scattered light beam 308 into the resonator 305, what is referred to as a self-mixing effect occurs within the resonator 305. That is to say modulation of the laser amplification occurs, the frequency of which depends on the Doppler shift of the scattered light beam 308 and therefore also on the described speed component.

The change $\Delta g$ over time in the laser amplification as a function of the speed component $v_L$ of the relative movement between the resonator 305 and the roadway surface 303 in the direction of the measuring light beam 302 is described by the following equation:

$$\Delta g = -\frac{\kappa}{L} \cdot \cos(4 \cdot \pi \cdot f_0 \cdot v_L \cdot t/c + 4 \cdot \pi \cdot L_0 \cdot f_0/c) \qquad (1)$$

Here, $\kappa$ denotes a laser-specific coupling coefficient which has a value between zero and one, $f_0$ denotes the frequency of the light emitted by the laser unit 108i, c denotes the speed of light and t denotes the time. Equation (1) results, for example, from the theory of the self-mixing effect in M. H. Koelink et al., "Laser Doppler velocimeter based on the self-mixing effect in a fiber-coupled semiconductor laser: theory", Applied Optics, Vol. 31, 1992, pages 3401-3408.

The periodic modulation of the laser amplification leads to corresponding period modulation of the intensity of the light emitted by the resonator 305. The speed component $v_L$ can be determined from the frequency with which the measured intensity changes periodically. In order to measure the intensity of the light emitted by the resonator 305, the photodiode 309 is provided, which senses light which emerges from the resonator 305 through the rear mirror 307. Such a diode 309 is usually used to keep the intensity of the laser light constant or regulated and is therefore generally already a component of the equipment of commercially available laser diodes. In the present application, the photodiode 309 is used in order acquires the frequency of the changes in intensity from the time profile of the measured intensity and determines the speed component $v_L$ on the basis of this frequency.

The transversal speed of the vehicle 101 can be sensed by means of a suitably equipped laser unit 301. The laser unit 301 can, for example, be mounted vertically below the center of gravity of the vehicle on the underfloor of the vehicle, and the measuring light beam 302 can be oriented in the transversal direction of the vehicle. By means of the angle at which the measuring light beam 302 is directed onto the roadway surface 303 it is possible to determine the transversal speed of the vehicle 101 from the speed component $v_L$ measured by means of the laser unit 301. The angle is obtained from the installation position of the laser unit 301 and can be stored as a parameter in the vehicle. The influence of changes in geometry on the measurement of speed due to rolling movements and pitching movements of the vehicle 101 can generally be ignored.

A further laser unit 301, which is preferably also attached vertically below the center of gravity of the vehicle and whose measuring light beam 302 is oriented in the longitudinal direction of the vehicle, can be used to sense the vehicle longitudinal speed.

In a further embodiment, the speed sensor 111 can comprise a position-determining system. This is preferably a satellite-supported system which is based, for example, on the global positioning system (GPS) or the GALILEO system. The transversal speed and/or longitudinal speed of the vehicle 101 can be acquired here by tracking the position of the vehicle 101 by means of the position-determining system.

Figure 4:
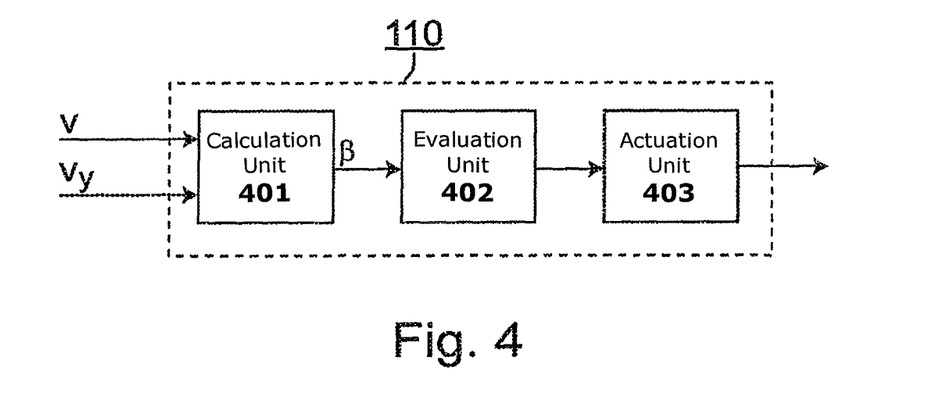
FIG. 4 is a schematic illustration of a block diagram of the control unit of the vehicle movement dynamics control system in a first embodiment.

The components of the provided vehicle movement dynamics control system which are contained in the control unit are illustrated in FIG. 4 in a schematic block diagram.

The input signals, i.e. the sensed longitudinal speed v and transversal speed $v_y$, are fed to the calculation unit 401. The latter determines the attitude angle β of the vehicle 101 from the input signals. This is the angle between the longitudinal axis of the vehicle and the direction of movement of the vehicle 101. The attitude angle β is preferably determined in the calculation device 401 in accordance with the relation $$\beta = \arctan \frac{v_y}{v}. \tag{2}$$

The calculated value is then transferred to the evaluation unit 402. The control unit 110 preferably calculates a value for the attitude angle β in each clocking step.

In the evaluation device 402, the sign of the attitude angle β which gives the direction of a bend through which the vehicle 101 is traveling is acquired. In addition, the absolute value of the attitude angle β is compared with a threshold value. The threshold value characterizes the boundary between stable and unstable driving states. Said threshold value is acquired, for example, by means of driving trials for a specific type of vehicle and is stored as a parameter in the control unit 110. A stable driving state is detected if the absolute value of the attitude angle β is smaller than the threshold value. In this case, no intervention is made into the driving behavior of the vehicle 101. An unstable driving state, in particular an oversteering driving state, is detected if the absolute value of the attitude angle β is greater than the threshold value. In this case, the difference between the attitude angle β and the threshold value together with the sign of the attitude angle are transferred to the actuation unit 403.

In the case of oversteering driving behavior of the vehicle, the actuation unit 403 determines an actuating request which is transferred to the hydraulic unit 203 and implemented by the hydraulic unit 203. According to the actuating request, the front wheel 102a, 102b, which is on the outside of the bend, of the vehicle 101 is braked in order to stabilize the vehicle 101. The actuating request is preferably determined in accordance with the difference between the attitude angle and the threshold value, preferably embodied as a PID controller. The wheel on the outside of the bend is determined on the basis of the direction of the bend, which can be ascertained from the sign of the attitude angle.

Figure 5:
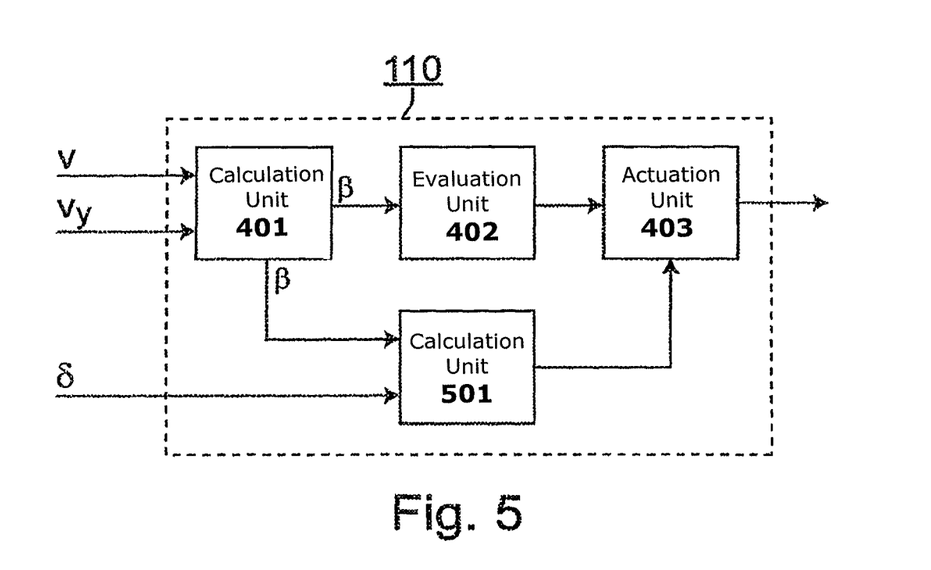
FIG. 5 is a schematic illustration of a block diagram of the control unit of the vehicle movement dynamics control system in a second embodiment.

A further embodiment of the vehicle movement dynamics control system differs from the previously described embodiment in that a further evaluation unit 501 is provided which is configured so as to detect unstable driving situations which are due to understeering of the vehicle 101. The components of the vehicle movement dynamics control system which are contained in the control unit 110 in this embodiment are illustrated in FIG. 5 in a schematic block diagram.

An input signal apart from the vehicle longitudinal speed v and the vehicle transversal speed $v_y$ is the wheel lock angle δ of the front wheels 102a, 102b of the vehicle 101. The latter can be sensed, for example, in a way known per se to a person skilled in the art by means of a steering angle sensor 114. The steering angle sensor 114 can be arranged inside a steering train which connects the front wheels 102a, 102b to the steering handle which is operated by the driver.

The wheel lock angle δ and the attitude angle β which is acquired in the calculation device from the longitudinal speed v and the transversal speed $v_y$ are fed to the calculation unit 501. The latter acquires, on the basis of the longitudinal speed v, a maximum possible theoretical wheel lock angle $\delta_{theor.}$. If the of the wheel lock angle δ is above the theoretical wheel lock angle $\delta_{theor.}$ and if the acquired attitude angle β is below a threshold value, an unstable understeering situation is detected.

If an instability of the vehicle 101 has been detected in the evaluation unit 501 owing to understeering, the actuation unit 403 generates actuating requests for influencing the driving behavior. Compared to the embodiment of the control unit 110 which was described above with reference to FIG. 4, the actuation unit in the present embodiment is modified in such a way that it can generate such actuating requests.

In one embodiment, the actuation unit 403 influences the drive engine 103 or an engine control device in an understeering situation in such a way that the driving torque which is made available by the engine is reduced in order to stabilize the vehicle 101. As a result, the vehicle 101 can be stabilized in understeering situations even if the vehicle 101 has only one simplified hydraulic unit 109 which permits a buildup of brake pressure only in the wheel brakes 108a, 108b of the front wheels 102a, 102b.

If the hydraulic unit 109 permits a buildup of brake pressure in the wheel brakes 108c, 108d of the rear wheels 102c, 102d, a braking force can be applied to the rear wheel 102c, 102d on the inside of the bend as an alternative to or in addition to the intervention into the engine control. For this purpose, a corresponding actuating request is generated in the actuation unit 403 and is transmitted to the hydraulic unit 109. The rear wheel 108c, 108d on the inside of the bend is determined on the basis of the direction of the bend which is being traveled through and which can be determined from the sign of the sensed wheel lock angle δ.

Although the invention has been described in detail in the drawings and the preceding presentation, the presentations are to be understood as illustrative or exemplary and not restrictive; in particular, the invention is not restricted to the explained exemplary embodiments. Further variants of the invention and their implementation emerge from the preceding disclosure, the Figures and the patent claims in a way which is obvious to a person skilled in the art.

Terms such as "comprise", "have", "include", "contain" and the like which are used in the patent claims do not exclude further elements or steps. The use of the indefinite article does not exclude a plurality. An individual device can carry out the functions of a plurality of units or devices specified in the patent claims.

The invention claimed is:

1. A system for stabilizing a motor vehicle comprising:
at least one optical speed sensor for sensing a longitudinal speed and a transversal speed of the motor vehicle, by evaluating light which is reflected on a roadway surface on which the motor vehicle is moving during operation;
a steering angle sensor for sensing a wheel lock angle of the motor vehicle;
a calculation unit which is configured to calculate an attitude angle of the motor vehicle from a sensed longitudinal speed and a sensed transversal speed;
an evaluation unit which is coupled to the calculation unit and is configured to compare the attitude angle with a predefined attitude angle threshold value, and compare the wheel lock angle to a predefined wheel angle threshold,
wherein an oversteering situation is detected when the attitude angle is greater than the predefined attitude angle threshold, and
wherein an understeering situation is detected when the attitude angle is less than the predefined attitude angle threshold and the wheel lock angle is greater than the wheel angle threshold; and
an actuation unit which is coupled to the evaluation unit, and an actuator including a hydraulic unit which influences a driving behavior of the motor vehicle,
wherein the actuation unit is configured to control the hydraulic unit in accordance to the attitude angle in the detected oversteering situation, and
wherein, in the detected understeering situation, the actuation unit is configured to control at least one of: 1) the hydraulic unit in accordance to the attitude angle, and 2) a drive engine of the motor vehicle in accordance to the attitude angle, such that at least one of a speed and acceleration of the motor vehicle are reduced.

2. The system as claimed in claim 1, wherein the speed sensor comprises a position-determining system, and wherein at least one of the vehicle transversal speed and the vehicle longitudinal speed are determined by tracking a position of the motor vehicle by the position-determining system.

3. The system as claimed in claim 1, wherein the actuator is configured to apply a braking force to a front wheel of the motor vehicle on a basis of an actuation by the actuation unit in an oversteering situation.

4. The system as claimed in claim 1 wherein the vehicle transversal speed and the vehicle longitudinal speed are the only vehicle movement dynamics variables which can be sensed.

5. The system as claimed in claim 1, also comprising a steering angle sensor for sensing a wheel lock angle which is set at steerable wheels of the motor vehicle, and a further evaluation unit which is configured to detect an understeering situation on a basis of the attitude angle and of the wheel lock angle.

6. The system as claimed in claim 5, wherein the further evaluation unit is configured to detect an understeering situation if an attitude angle which has been acquired in accordance with the wheel lock angle is larger than a calculated attitude angle by a predefined absolute value.

7. The system as claimed in claim 1, wherein the actuator is configured to apply a braking force to a rear wheel of the motor vehicle on a basis of actuation by the actuation unit in an understeering situation.

8. The system as claimed in claim 1, wherein the actuator is configured in such a way that it can apply a braking force exclusively to front wheels of the motor vehicle.

9. A method for stabilizing a motor vehicle, comprising the following steps:
sensing, by at least one optical speed sensor, a longitudinal speed and a transversal speed of the motor vehicle;
sensing, by a steering angle sensor, a wheel lock angle of the motor vehicle;
calculating, by at least one processor, an attitude angle of the motor vehicle from the sensed vehicle longitudinal speed and the sensed vehicle transversal speed;
comparing, by the at least one processor, the attitude angle with a predefined attitude angle threshold value;
comparing, by the at least one processor, the wheel lock angle to a predefined wheel angle threshold;
detecting an oversteering situation when the attitude angle is greater than the predefined attitude angle threshold;
detecting an understeering situation when the attitude angle is less than the predefined attitude angle threshold and the wheel lock angle is greater than the wheel angle threshold;
actuating at least one hydraulic actuator device in accordance with the attitude angle in order to influence the driving behavior of the motor vehicle once an oversteering situation is detected; and
actuating, in accordance with the attitude angle in order to influence the driving behavior of the motor vehicle once an oversteering situation is detected, at least one of: 1) the hydraulic actuator, and 2) a drive engine of the motor vehicle, such that at least one of a speed and acceleration of the motor vehicle are reduced.

* * * * *

UNITED STATES PATENT AND TRADEMARK OFFICE
CERTIFICATE OF CORRECTION

PATENT NO. : 8,645,025 B2
APPLICATION NO. : 12/673539
DATED : February 4, 2014
INVENTOR(S) : Groitzsch et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 999 days.

Signed and Sealed this

Twenty-ninth Day of September, 2015

Michelle K. Lee
*Director of the United States Patent and Trademark Office*